United States Patent [19]

Schnizler

[11] Patent Number: 5,499,830
[45] Date of Patent: Mar. 19, 1996

[54] KEYLESS CHUCK

[75] Inventor: Albrecht Schnizler, Nürtingen, Germany

[73] Assignee: Metabowerke GmbH & Co., Nurtingen, Germany

[21] Appl. No.: 435,840

[22] Filed: May 5, 1995

[30] Foreign Application Priority Data

May 7, 1994 [DE] Germany .......................... 44 16 224.3

[51] Int. Cl.⁶ ..................................................... B23B 31/12
[52] U.S. Cl. .............................. 279/62; 279/140; 279/902
[58] Field of Search ................................ 279/60–65, 140, 279/902

[56] References Cited

U.S. PATENT DOCUMENTS

| | | | |
|---|---|---|---|
| 3,970,323 | 7/1976 | Schnizler, Jr. | 279/64 |
| 4,302,021 | 11/1981 | Rohm | 279/60 |
| 5,031,925 | 7/1991 | Tatsu et al. | 279/60 |
| 5,431,419 | 7/1995 | Mack | 279/140 |
| 5,435,578 | 7/1995 | Rohm | 279/902 |

*Primary Examiner*—Steven C. Bishop
*Attorney, Agent, or Firm*—Charles E. Baxley

[57] ABSTRACT

A chuck has a chuck body and a clamping sleeve as well as tool clamping jaws which are held in oblique guides and which, by rotation of the chuck body, can be displaced relative to the clamping sleeve. It furthermore has a tightening device which has a compression spring, which acts in the direction of rotation, an intermediate ring acted on thereby which is rotatable with respect to the chuck body and the clamping sleeve, an unlockable locking member on the intermediate ring, and an outside, rotatable gripping sleeve having an inner stop for the intermediate ring.

10 Claims, 2 Drawing Sheets

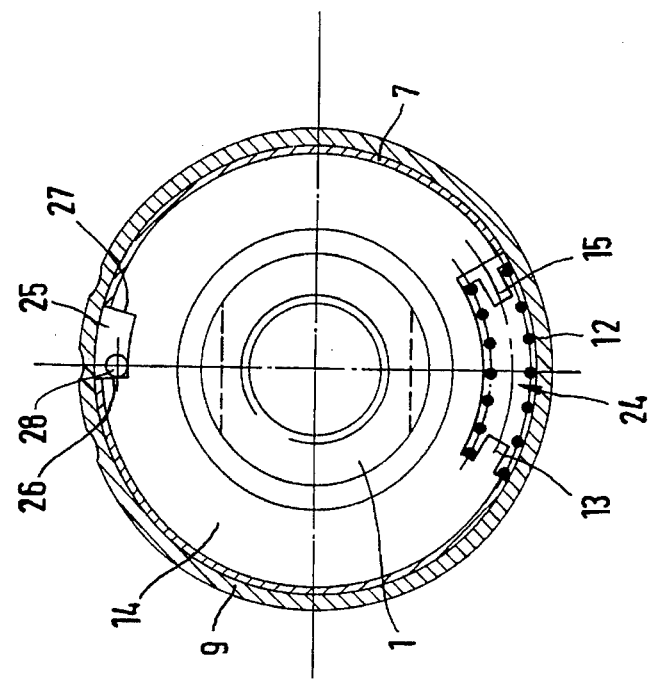
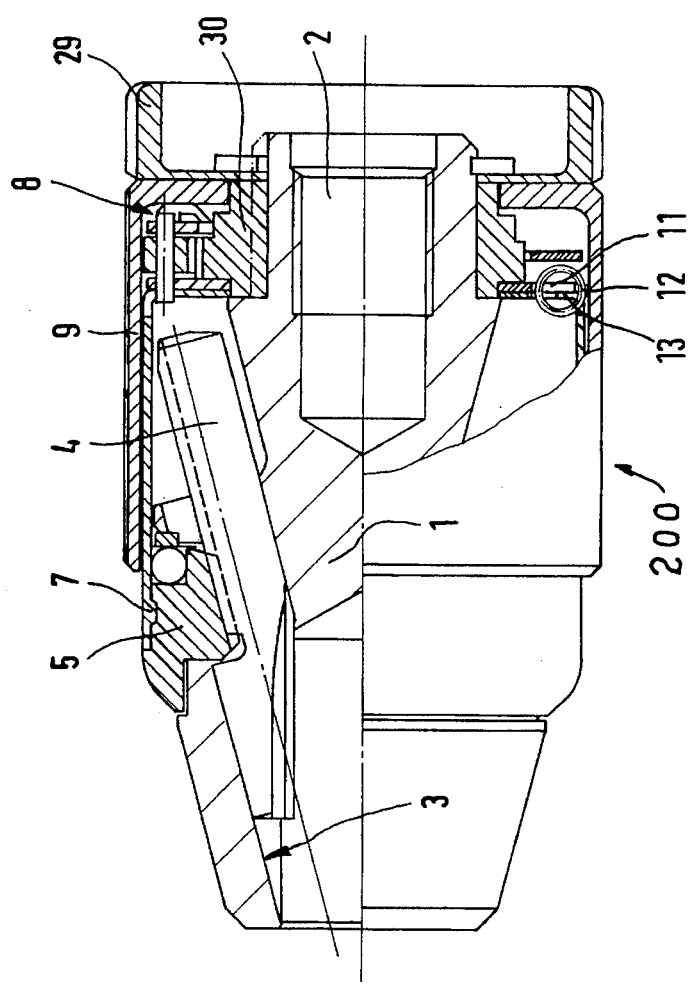

KEYLESS CHUCK

FIELD OF THE INVENTION

The present invention relates generally to chucks which are also known as jaw chucks and which are used for gripping of drills, screwdriver bits or the like.

BACKGROUND OF INVENTION

The prior art related to chucks includes the device shown in U.S. Pat. No. 3,970,323. In this patent the compression spring of the tightening device rests, on the one hand, against the body of the chuck and, on the other hand, against the intermediate ring, and the clamping sleeve is locked via a toothing and a pawl locking member on the intermediate ring in the direction against the direction of clamping rotation with respect to the intermediate ring. Accordingly in this case, the force of the compression spring is transmitted directly via the intermediate ring to the clamping sleeve, which has the disadvantage that for the cocking of the compression spring which acts in the direction of rotation, the gripping sleeve of the tightening device must be actuated in the same direction of rotation as that in which the chuck body turns relative to the clamping sleeve for the clamping of the clamping jaws. In the known chuck, by the holding fast of the clamping sleeve, the clamping jaws can first of all be brought into their clamping position until resting against the tool in question, whereupon the clamping sleeve turns in one's hand or the drive motor is stopped. In this way, there is not yet commenced the tightening effect with the following disadvantageous results in operation: the clamping jaws act on the tool shank in question in addition with the force of the compression spring in order to prevent automatic loosening of the clamping jaws particularly in the case of vibrations. For the activating of the tightening effect, in the case of the known chuck, while the gripping sleeve is held fast, the clamping sleeve must be turned further in the clamping direction of rotation of the body of the chuck, and it is thus not possible, via the rotary drive of the chuck body by which the clamping jaws can be brought into their clamping position, in addition to also actuate the tightening device.

Conversely, a loosening of the tightening device cannot be affected via the motor drive of the chuck body. For loosening in the case of the known chuck, the gripping sleeve must be turned in the direction of rotation of the opening of the chuck body and only then is the opening of the clamping jaws possible by holding the clamping sleeve and causing rotation of the chuck body in the direction of rotation in which the gripping sleeve had to be previously turned. The decisive factor for the disadvantage described is, therefore, that the relative rotation between the chuck body and the gripping sleeve is not able to effect the clamping of the clamping jaws as well as the following actuation of the tightening device. Conversely, the deactuation of the tightening device and the loosening of the clamping jaws in each case in the same direction of relative rotation is not possible.

SUMMARY OF INVENTION

The object of the present invention is therefore to provide a keyless chuck in which both the clamping jaws and the tightening device can be actuated, in each case in the same direction of rotation, via the gripping sleeve and the chuck body which is turnable relative thereto.

In accordance with the present invention there is provided a keyless chuck which has a chuck body and a clamping sleeve as well as tool clamping jaws which are held in oblique guides and which, by rotation of the chuck body can be displaced relative to the clamping sleeve. The keyless chuck also has a tightening device which has a compression spring which acts in the direction of rotation, an intermediate ring acted on thereby which is rotatable with respect to the chuck body and the clamping sleeve, an unlockable locking member on the intermediate ring, and an outside, rotatable gripping sleeve having an inner stop for the intermediate ring. In order that the chuck can be closed and opened in the same relative direction of rotation between the gripping sleeve and the chuck body, the compression spring is arranged between the clamping sleeve and the intermediate ring, the intermediate ring being turnable in limited manner with respect to the clamping sleeve, and the locking member on the intermediate ring striking in its locking position against the chuck body in such a manner that the chuck body and the intermediate ring are locked with respect to each other.

It is essential for the invention that the compression spring which acts in the direction of rotation be arranged between the clamping sleeve and the intermediate ring and that the lock which acts in the direction of rotation be arranged between the intermediate ring and the body of the chuck. The locking action in the direction opposite the direction of the clamping rotation blocks the intermediate ring with respect to the body of the chuck, and, with the gripping sleeve held fast and chuck body driven, the chuck sleeve travels in the direction of clamping rotation, cocking the compression spring, onto the intermediate ring which is held fast as soon as the clamping sleeve is carried along in the direction of rotation by the body of the chuck when the chuck jaws come against the tool shank in question. Since the direction of clamping rotation is the same for the clamping jaws and the tightening device, it is possible here, in one stroke, by the holding fast of the gripping sleeve, to effect the clamping of the chuck to such an extent that the tightening device is also activated at the end of the clamping process. In the opposite direction of rotation, it is possible to loosen the chuck, in which connection, the tightening device is first of all unlocked and the clamping jaws then brought into their open position.

BRIEF DESCRIPTION OF THE DRAWINGS

Other objects and advantages of the invention will be apparent from the detailed description which follows, taken in connection with accompanying drawings in which:

FIG. 3 is a cross-sectional view taken along the line 3—3 of FIG. 1;

FIG. 4 is a view similar to FIG. 1 showing an alternative embodiment of the invention which incorporates a grip ring.

DETAILED DESCRIPTION OF THE INVENTION

Figure 2:
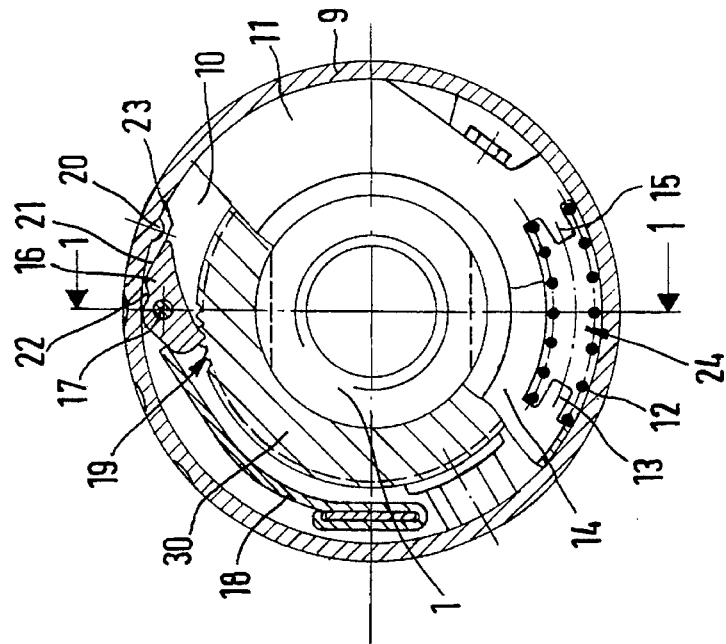
FIG. 2 is a cross-sectional view taken along line 2—2 of FIG. 1.
Figure 1:
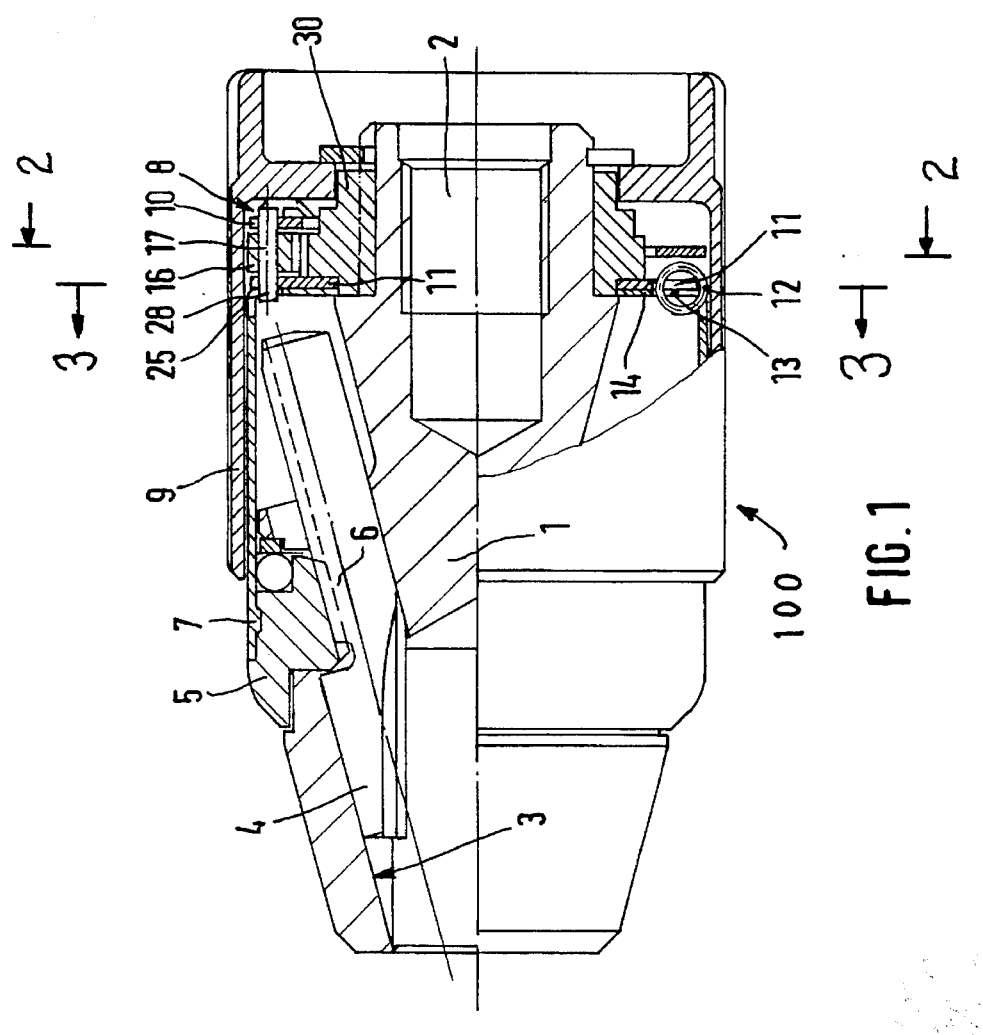
FIG. 1 is a side view, partially in cross-section, of a keyless chuck made in accordance with the present invention with the partial cross-section taken along the line 1—1 of FIG. 2.

Referring to the drawings wherein like reference numbers designate like or corresponding parts throughout, there is shown in FIG. 1 a keyless chuck 100, made in accordance with the present invention, which includes a central chuck body 1 which comprises a body of rotational symmetry extending substantially over the entire length of the chuck 100.

On its rear end, the chuck body 1 has a spindle receiver 2 via which the chuck 100 is placed on a drive spindle of an electric hand drill or the like. Towards its front end, the chuck body 1 has, disposed therein, oblique guides 3 which extend in forward direction towards the other, and a clamping jaw 4 is held in each of these oblique guides. As a rule, three such chuck jaws 4 are present, arranged 120° apart, their inner sides having clamping surfaces which are paraxial to the chuck body 1. By displacement along the oblique guides 3 in forward direction, he clamping jaws 4 can be brought into their clamping position, which is reached when the clamping surfaces of the clamping jaws 4 rest against the shank of the tool in question.

The clamping jaws 4 are driven by a relative rotation between the chuck body 1 and a threaded ring 5 which engages with an internal thread in oblique teeth 6 on the clamping jaws 4. A clamping sleeve 7 which extends rearward over the adjustment region of the clamping jaws 4 and up to a tightening device 8 is fixed for rotation to the threaded ring 5. The clamping sleeve 7 and the chuck body 1 are rotatable relative to each other as long as the clamping jaws 4 are not located either in their front clamping position or in their rearward position. If the clamping sleeve 7 is stationary and the chuck body 1 turns, then the clamping jaws 4 are displaced along the oblique guides 3; when the displacement path of the clamping jaws 4 in the clamping position and the rear end position are exhausted, the chuck body 1 then strives to carry the clamping sleeve 7 along in its rotation via the chuck jaws 4 and the threaded ring 5. The same is true when the clamping jaws 4 have come against a tool shank in the clamping direction of rotation.

The clamping sleeve 7 is surrounded by a gripping sleeve 9 which extends forward beyond the tightening device 8 up close to the front end of the clamping sleeve 7. The gripping sleeve 9 is gripped for the clamping and loosening of the chuck 100 while the clamping sleeve 7 is not. The clamping sleeve 7 and the gripping sleeve 9 are of limited rotation with respect to each other but, in principle, there is a connection active in the direction of rotation, between the clamping sleeve 7 and the gripping sleeve 9 via the tightening device 8.

The tightening device 8 has intermediate rings 10, 11, which consists of two disks 10 and 11 which are connected for rotation with each other. Between the front disk 11 of the intermediate ring 10, 11 and the clamping sleeve 7 there is a compression spring 12 which acts in the direction of rotation. The clamping sleeve 7 for this purpose has an abutment 13 for the compression spring 12, which abutment is present on a flange 14 which lies in the radial direction and is arranged on the rear end integrally on the clamping sleeve 7. Similarly, the disk 11 of the intermediate rings 10, 11 has a second abutment 15 for the compression spring 12 which lies opposite the first abutment 13 on the flange 14 of the clamping sleeve 7 along a circular section which is concentric to the axis of the chuck body 1. Between said abutments 13 and 15, the compression spring 12 extends along said circular section. In order to create room for the compression spring 12, the disk 11 of the intermediate ring 10, 11 and the flange 14 of the clamping sleeve 7 have recesses 24 on the periphery.

In its clamping position, the compression spring 12 must exert a force which acts on the clamping sleeve 7 in the clamping direction of rotation in order to secure the clamping jaws 4 in their clamping position on the shank of the tool. For this purpose, the compression spring 12 must be cocked and supported in its cocked position on the chuck body 1, which takes place via the intermediate rings 10, 11.

Approximately diametrically opposite the recess 24 in the disk 11, a locking member 16 in the form of a pawl is arranged on the intermediate rings 10, 11, the pawl being seated on a pin 17 which extends between the disks 10 and 11. The locking member 16 is so acted on by a leaf spring 18 that in its locking position, it engages into an outer tooth 19 of a detent ring 30 which is fixed for rotation to the chuck body 1. In the direction of the compression spring 12, the intermediary rings 10, 11 rest, via the locking member 16, against the detent ring 30 and thus against the chuck body 1, as long as the locking member 16 is in the locking position.

The intermediate rings 10, 11 in turn, are only of limited rotation with respect to the gripping sleeve 9, since the gripping sleeve 9 has an inner stop 20 against which a mating stop 23 on the intermediate rings 10, 11 come in contact as soon as the chuck body 1 is driven in the direction of clamping rotation and the gripping sleeve 9 is held fast. This results from the fact that, as mentioned, with the clamping jaws 4 firmly seated, the chuck body 1 carries the clamping sleeve 7 along with it via the threaded ring 5 and the clamping sleeve 7 acts via the compression spring 12 on the intermediate rings 10, 11 in the direction of clamping rotation. With the gripping sleeve 9 held fast, and therefore not also turning, the intermediate rings 10, 11 are blocked in their further rotation with the mating stop 23 resting against the inner stop 20 of the gripping sleeve 9, and the compression spring 12 is then cocked via the clamping sleeve 7, in which connection the chuck body 1 can turn away below the locking member 16 on the intermediate rings 10, 11. If the cocked end position of the compression spring 12 is reached, the chuck body 1 either remains stationary in case of too weak a driving force or, in the case of a stronger driving force, the gripping sleeve 9 turns in the hand of the operator. In this way, with the clamping jaws 4 seated, the tightening device 8 is actuated and the clamping sleeve 7 rests, under the force of spring 12, against the chuck body 1. It is important that both for the bringing of the clamping jaws 4 into their clamping position and for the activating of the tightening device 8, the chuck body 1, with the gripping sleeve 9 held fast, need not change its direction of rotation.

For the loosening of the tightening device 8 and of the clamping jaws 4, the chuck body 1, with the gripping sleeve 9 held fast, is driven in the opposite direction of rotation. In this connection, the locking member 16 which is carried along by the chuck body travels, via a run-on side, or ramp 21, which is formed as a run-on bevel, against the inner stop 20 of the gripping sleeve 9, as a result of which the locking nose of the locking member 16 is released from the outer teeth 19 of the detent ring 30, whereupon the chuck body 1 can turn below the locking member 16 with simultaneous relaxation of the compression spring 12. With the gripping sleeve 9 continuously held fast, the clamping jaws 4 then open upon further rotation of the chuck body 1 in the same direction. The locking member 16 is secured in its unlocked position by the inner stop 20 of the gripping sleeve 9, as a result of which, at the same time, relative rotation is prevented between the gripping sleeve 9 and the intermediate rings 10, 11 in the direction of rotation of relaxation. The locking member 16 has a pocket-shaped recess 22 on the side thereof facing the gripping surface, within which pocket the inner stop 20 of the gripping sleeve 9 is received in the unlocked position of the locking member 16.

In principle, the compression spring 12 between the intermediate ring 10, 11 and the flange 14 of the clamping sleeve 7 can act also as a tension spring, so that upon the loosening of the chuck via the gripping sleeve 9, the clamping sleeve 7 can be stopped when the chuck body 1 turns in the direction opposite the direction of clamping rotation. However, it is advisable to limit the path of the compression spring 12 both in the cocking and in the relaxing directions. As shown in FIG. 3, in the region of the outer edge there is cut into the flange 14 of the clamping sleeve 7 a window 25 the flanks of which lying in radial direction, form stops 26 and 27. Into the window 25 there extends a finger 28 which is an extension of the pin 17 which is arranged paraxially in the intermediate ring 10, 11 and on which the locking member 16 is mounted. The clamping sleeve 9 is thus turnable relative to the intermediate ring 10, 11 by the distance apart of the stops 26 and 27 as seen in the direction of rotation and, with suitable dimensioning of the compression spring 12, this path is sufficient to apply the spring compressive force which additionally secures the clamping jaws 4. In the starting position, the compression spring 12 holds the finger 28 against the flank 26 of the window 25, which is also the position in which the clamping sleeve 7 can be held fast upon the opening of the chuck via the gripping sleeve 9 and the intermediate ring 10, 11. Upon the clamping process, with the placing of the clamping jaws on the tool shank in question and compression of the compression spring 12, the finger 28 travels in the window 25 from stop 26 to stop 27, which is so arranged that when it is encountered, blocking of the compression spring 12 still does not take place. If the finger 28 lies against the stop 27 in the window 25 of the clamping sleeve 7, there is a rotary lock between the clamping sleeve 7 and intermediate ring 10, 11, which, upon the coming of its mating stop 23, against the inner stop 20 of the gripping sleeve 9, is fixed for rotation with it also in the clamping direction.

The operation of the chuck is very simple. With the chuck jaws open, the chuck body 1 is driven in the clamping direction of rotation for the gripping of the tool and the gripping sleeve 9 is held fast by a user. As soon as the mating stop 23 of the intermediate rings 10, 11 has come against the inner stop 20 of the gripping sleeve 9, the carrying along of the clamping sleeve 7 is prevented via the gripping sleeve 9 and the intermediate rings 10, 11. As a result of the relative rotation between the chuck body 1 and the clamping sleeve 7, the clamping jaws 4 move into their clamping position. As soon as the clamping jaws 4 come against the tool shank in question, the clamping sleeve 7 is carried along to the direction of clamping rotation by the chuck body 1 via the threaded ring 5. With the gripping sleeve 9 still held fast, the compression spring 12 is now compressed, the finger 28 now traveling from stop 26 to stop 27 in the window 25 of the flange 14 of the clamping sleeve 7. Since, when the intermediate rings 10, 11 come against the inner stop 20 of the gripping sleeve 9, the locking member 16 engages into the teeth 19 of the detent ring 30, the intermediate ring 10, 11 can now, after the letting loose of the gripping sleeve 9, no longer turn opposite the clamping direction of rotation with respect to the chuck body 1, so that the intermediate ring 10, 11 then forms a fixed abutment with the chuck body 1 in the cocking direction of the compression spring 12, as a result of which the clamping sleeve 7 is acted on by the spring force which holds the clamping jaws against the clamped tool. In this way, the clamping process is completed. The clamping process can be effected without change of the direction of rotation via the chuck body 1 and the gripping sleeve 9. In the opposite direction of rotation of the chuck body, the chuck 100 is opened after release of the intermediate rings 10, 11 with respect to the chuck body 1 upon the travel of the locking member 16 onto the inner stop 20 of the gripping sleeve 9.

The chuck 100 described can be used predominantly in battery operated drills which do not develop any great torque. Machines of higher drive power, or greater torque, should be operated with a reduced speed of rotation in order to prevent too vigorous a turning of the gripping sleeve 9 in the hand of the user during the clamping or loosening of the chuck 100.

Machines of higher drive power may utilize the alternative embodiment of the invention 200 shown in FIG. 4. The keyless chuck 200, shown in FIG. 4, is provided at its rear end with a grip ring 29 which is connected, fixed for rotation, with the chuck body 1. Thus, with the machine stationary, the gripping sleeve 9 and the gripping ring 29 can be turned relative to each other upon the clamping or loosening of the chuck 200, and in this manner, in particular, the tightening device 8 can be operated and either clamped or released.

The foregoing specific embodiments of the present invention as set forth in the specification herein are for illustrative purposes only. Various changes and modifications may be made to these specific embodiments with a spirit and scope of this invention.

I claim:

1. A keyless chuck comprising:
   a chuck body with said chuck body having oblique guide means,
   a clamping sleeve, with said clamping sleeve mounted on said chuck body,
   tool clamping jaws with said tool clamping jaws held in said oblique guide means and with said tool clamping jaws displaceable as a result of rotation of said chuck body relative to said clamping sleeve,
   tightening means, mounted on said chuck body with said tightening means comprising:
      a compression spring,
      intermediate ring means with said intermediate ring means rotatably mounted with respect to said chuck body and said clamping sleeve, and with said intermediate ring means acted upon by said compression spring,
      an unlockable locking means with said unlockable locking means mounted on said intermediate ring means,
      an outer gripping sleeve, with said outer gripping sleeve having inner stop means cooperating with said intermediate means,
      with said compression spring disposed between said clamping sleeve and said intermediate ring means,
      rotation limiting means, with said rotation limiting means limiting rotation of said intermediate ring means with respect to said clamping sleeve,
      and with said locking means capable of a locked position in which said chuck body and said intermediate means are locked together thereby preventing loosening of said tool clamping jaws.

2. A keyless chuck according to claim 1 in which said rotation limiting means comprises a pair of spaced apart stop means with a first of said stop means disposed on said intermediate ring means and a second of said stop means disposed on said clamping sleeve.

3. A keyless chuck according to claim 1 further comprising:
  a radially disposed flange mounted on said clamping sleeve and disposed proximate to said intermediate ring means with said flange having a window having a pair of facing spaced apart flanks, and
  a finger mounted on said intermediate ring means and with said finger projecting into said window, and with said flanks forming stop members and thereby limiting motion of said finger.

4. A keyless chuck according to claim 1 in which said unlockable locking means comprises:
  a pawl member mounted on said intermediate ring means,
  spring loading means for loading said pawl member and
  tooth means formed in said chuck body and engaging said pawl member in said locked position.

5. A keyless chuck according to claim 1 further comprising:
  a radially disposed flange mounted on said clamping sleeve and disposed proximate to said intermediate ring means with said flange having a window with said window having a pair of facing spaced apart flanks,
  a finger mounted on said intermediate ring means and with said finger projecting into said window, and with said flanks forming stop members and thereby limiting motion of said finger said locking means comprising,
  a pawl member mounted on said finger,
  spring loading means for loading said pawl member and
  tooth means formed in said chuck body and engaging said pawl member in said locked position.

6. A keyless chuck according to claim 1 in which said inner stop means on said outer gripping sleeve comprises:
  ramp means formed on said clamping sleeve, with said ramp means cooperating with said locking means to unlock said locking means thereby releasing said chuck body and said intermediate ring means.

7. A keyless chuck according to claim 1 in which said intermediate ring means comprises:
  a pair of spaced apart coaxial disks, with said locking means mounted between said coaxial disks and
  compression spring abutment means disposed on at least one of said coaxial disks.

8. A keyless chuck according to claim 7 further comprising:
  a first recess portion formed in one of said coaxial disks,
  first compression spring abutment means disposed on said coaxial disks and projecting into said first recess portion,
  a second recess portion formed in said flange mounted on said clamping sleeve,
  second compression spring abutment means disposed on said flange and projecting into said second recess portion formed in said flange, with said compression spring disposed in said first and second recesses.

9. A keyless chuck according to claim 1 in which said outer gripping sleeve projects over said clamping sleeve.

10. A keyless chuck according to claim 1 further comprising:
  a gripping ring, with said gripping ring mounted on said chuck body for rotation with said chuck body and with said gripping ring disposed proximate to said gripping sleeve.

* * * * *